(No Model.)
C. F. SPENCER.
LACING.
No. 321,145. Patented June 30, 1885.
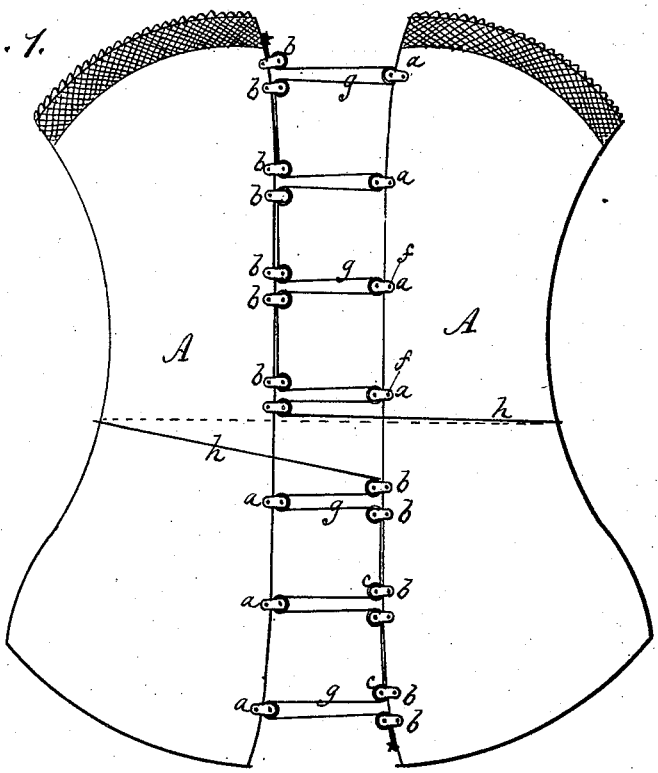
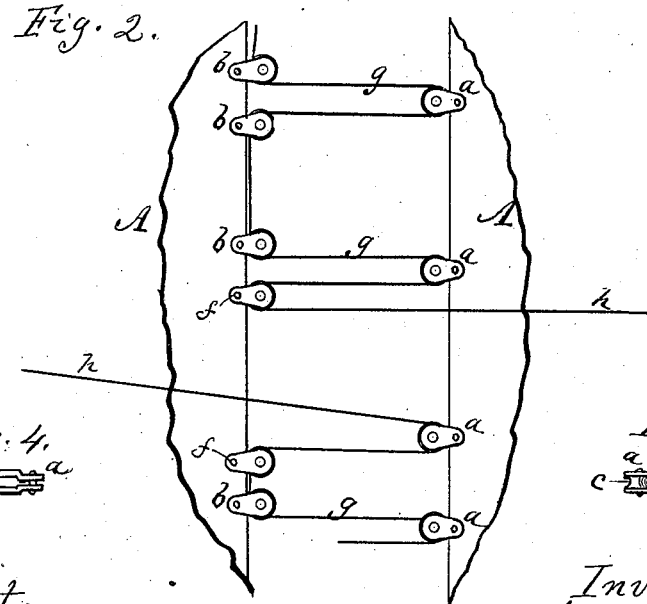
Attest.
R. F. Osgood.
Inventor.
Chas. F. Spencer

UNITED STATES PATENT OFFICE.

CHARLES F. SPENCER, OF ROCHESTER, NEW YORK, ASSIGNOR TO ABRAM S. MANN AND ELBERT B. MANN, BOTH OF SAME PLACE.

LACING.

SPECIFICATION forming part of Letters Patent No. 321,145, dated June 30, 1885.

Application filed October 27, 1884. (No model.)

*To all whom it may concern:*

Be it known that I, CHARLES F. SPENCER, of the city of Rochester, in the county of Monroe and State of New York, have invented a certain new and useful Improvement in Lacings; and I do hereby declare that the following is a full, clear, and exact description of the same, reference being had to the accompanying drawings, in which—

Figure 1 is a back view of a corset, showing my improvement applied thereto. Fig. 2 is a similar view of a portion of the same on an enlarged scale. Fig. 3 is an edge view of one of the lace-bearings. Fig. 4 is a view similar to Fig. 3, but showing a modification.

My improvement relates to lacings for corsets and other analogous articles, and is of that kind where a cord is passed alternately from side to side of the slit, and around studs or bearings at the sides, and is drawn up at the top to tighten the sides together. In ordinary lacings now in use the cord passes in a diagonal or angular direction from side to side, and the studs or bearings are alternated or break joints, and as a result the leverage, in drawing up the cord, is not applied effectively, owing to the diagonal pull, and, as a consequence, the sides of the slit cannot be properly drawn together, the sides wrinkle or pucker, and the strain on the cord is so great that it soon breaks.

My invention consists in combining, with the sides of a corset or other analogous article, a set of single studs or bearings on one side and a set of double studs or bearings on the other side, the double bearings coming opposite the single ones, and a cord that passes from side to side around the bearings in straight lengths, whereby the drawing action is at right angles to the sides of the slit, as hereinafter more fully described.

It also consists in the combination, with a corset or other analogous article, of a set of single studs or bearings on one side, a set of double studs or bearings on the other side, and two cords, starting from opposite ends, passing around the bearings at right angles to the sides to be laced, the free ends of the cords meeting intermediately, and being capable of being passed around the corset or other analogous article, and being tied to secure the lacing, all as hereinafter more fully set forth.

In the drawings, A A show the two sides of a corset which is to be laced. $a\,a$ are a set of single studs or bearings that are placed on one side of the slit, and $b\,b$ are a set of double studs or bearings that are placed on the other side of the slit. These bearings may be of any desired form and construction, and attached in any desired manner; but, as shown, they consist each of two plates inclosing a friction-pulley, $c$, and they are attached to the sides of the article by a single rivet, $f$. In Fig. 4 the pulley is dispensed with and a plain pin is used for the cord to run on. It will work well either way. A sharp-pointed spur may also be used instead of the rivet for attaching the bearing in place. These studs or bearings are so attached to the sides of the slit that the single bearing $a$ comes centrally opposite the double bearings $b\,b$ on the opposite side, as shown in Fig. 1, and the latter are separated at such a distance apart that the cord passing around the single bearing will pass in substantially straight lengths to the double bearings and at right angles to the sides of the slit.

$g\,g$ are two cords that form the lacing. One of these cords is attached on one side at the top, and the other on the other side at the bottom, as shown in Fig. 1. The cord is passed around one of the double bearings, thence across the slit, around the single bearing, thence across the slit again and around the second double-bearing, and thence it is carried alongside the side of the slit to the next double-bearing, where it is operated in the same manner. At the middle, or at some intermediate point, the two free ends of the cords meet and extend out in opposite direction, as shown at $h\,h$, and are made of such length that they can be carried around the corset, or other article, and tied together as a fastening.

By the use of single bearings on one side and double bearings on the other side, arranged diametrically opposite each other, and by passing the lacing-cords around the pulleys, as described, the lengths of the cords that cross the slit stand substantially at right angles to the sides of the slit at all parts of the drawing movement. Therefore the two sides of the slit will be drawn up squarely and without wrinkling, and a greater leverage is attained, as the pull is direct, less power is also required, and there is less danger of breaking the cord. In the ordinary lacing, where the cord extends diagonally across the slit, the power is applied in an indirect way, and the drawing action is produced only by the straightening of the cord, which strains greatly upon it and soon wears it out, and the sides of the slit are wrinkled and puckered. Besides this it is impossible to draw the cord so straight as to perfectly close the sides together, as the cord will bind so that while the top is tight the bottom will be loose.

By the use of two cords, as described, one starting from the top and the other from the bottom, the free ends meeting and passing out in opposite directions, the cords themselves can be used as a fastening by passing the ends around the corset or other article, and at the same time greater power is attained, as there is less friction than where one cord is used.

Having described my invention, what I claim as new, and desire to secure by Letters Patent, is—

1. In a lacing, the combination, with a corset or other analogous article to be laced, of a set of single bearings placed on one side of the slit, a set of double bearings placed on the other side, the two being diametrically opposite each other, and a cord attached to one side passing around one of the double bearings, thence around the single bearing, thence back around the other double-bearing, thence along the side of the slit to the next double bearing, and in the same manner around the remaining bearings, whereby the lacing extends at right angles across the slit, in the manner and for the purpose specified.

2. In a lacing, the combination, with a corset or other analogous article to be laced, of a set of single bearings placed on one side of the slit, a set of double bearings placed on the other side, the two being diametrically opposite, and two cords, one attached at the top and the other at the bottom, passing around the bearings at right angles to the slit, as described, the free ends of the cords meeting intermediately and extending outward in opposite directions, as shown and described, and for the purpose specified.

In witness whereof I have hereunto signed my name in the presence of two subscribing witnesses.

CHAS. F. SPENCER.

Witnesses:
P. A. COSTICH,
R. F. OSGOOD.